United States Patent
Zhu et al.

(10) Patent No.: US 9,869,587 B2
(45) Date of Patent: *Jan. 16, 2018

(54) FIBER GRATING DEMODULATION SYSTEM FOR ENHANCING SPECTRAL RESOLUTION BY FINELY SHIFTING LINEAR ARRAY DETECTOR

(71) Applicant: Beijing Information Science & Technology University, Beijing (CN)

(72) Inventors: Lianqing Zhu, Beijing (CN); Wei He, Beijing (CN); Mingli Dong, Beijing (CN); Fei Luo, Winchester, MA (US); Feng Liu, Beijing (CN); Xiaoping Lou, Beijing (CN); Hong Li, Beijing (CN)

(73) Assignee: BEJING INFORMATION SCIENCE & TECHNOLOGY UNIVERSITY, Beijing (CN)

( * ) Notice: Subject to any disclaimer, the term of this patent is extended or adjusted under 35 U.S.C. 154(b) by 17 days.

This patent is subject to a terminal disclaimer.

(21) Appl. No.: 15/292,283

(22) Filed: Oct. 13, 2016

(65) Prior Publication Data

US 2017/0108379 A1 Apr. 20, 2017

Related U.S. Application Data

(60) Provisional application No. 62/242,214, filed on Oct. 15, 2015.

(30) Foreign Application Priority Data

Oct. 14, 2015 (CN) .......................... 2015 1 0661305
Mar. 31, 2016 (CN) .......................... 2016 1 0200537

(51) Int. Cl.
*G01J 3/18* (2006.01)
*G02B 6/02* (2006.01)
*G02F 2/00* (2006.01)

(52) U.S. Cl.
CPC ........ *G01J 3/1895* (2013.01); *G02B 6/02076* (2013.01); *G02F 2/00* (2013.01)

(58) Field of Classification Search
CPC .......................... G02B 26/08; G02B 26/0808; G02B 26/0816; G01J 3/1895; G01J 3/0237;

(Continued)

(56) References Cited

U.S. PATENT DOCUMENTS 5,513,913 A * 5/1996 Ball ................... G01D 5/35383
250/227.14
6,031,661 A * 2/2000 Tanaami ................. G01B 11/24
356/613

(Continued)

*Primary Examiner* — Dominic J Bologna
(74) *Attorney, Agent, or Firm* — Locke Lord LLP; Tim Tingkang Xia, Esq.

(57) ABSTRACT

A fiber grating demodulation system for enhancing spectral resolution by finely adjusting a linear array detector, includes a laser pump source, a wavelength division multiplexer, a fiber Bragg grating, a diaphragm, a slit, a collimating mirror, a light splitting grating, an imaging focus mirror, a linear array detector. The laser pump source, the wavelength division multiplexer, and the fiber Bragg grating are connected in sequence, the wavelength division multiplexer is connected to the diaphragm. Light emitted from the laser pump source is multiplexed by the wavelength division multiplexer and then enters the fiber Bragg grating, and a reflection spectrum of the fiber Bragg grating enters the slit of the fiber grating demodulation system as injected light. After passing through the slit, the injected light is reflected by the collimating mirror, the light splitting grating, the imaging focus mirror in sequence, and is finally converged to the linear array detector.

5 Claims, 5 Drawing Sheets

(58) Field of Classification Search
CPC .......... G01J 3/06; G01J 3/04; G01J 2003/064; G01J 2003/069
See application file for complete search history.

(56) References Cited

U.S. PATENT DOCUMENTS

| | | | |
|---|---|---|---|
| 7,177,496 B1* | 2/2007 | Polynkin | G01J 3/32 385/18 |
| 2002/0122246 A1* | 9/2002 | Tearney | A61B 1/00096 359/368 |
| 2006/0012786 A1* | 1/2006 | Goto | G01J 3/04 356/328 |
| 2006/0256329 A1* | 11/2006 | Coppeta | G01J 3/02 356/301 |
| 2012/0247669 A1* | 10/2012 | Matsudo | G01K 5/50 156/345.27 |

* cited by examiner

FIBER GRATING DEMODULATION SYSTEM FOR ENHANCING SPECTRAL RESOLUTION BY FINELY SHIFTING LINEAR ARRAY DETECTOR

CROSS-REFERENCE TO RELATED APPLICATIONS

This application claims priority to and the benefit of, pursuant to 35 U.S.C. §119(e), U.S. provisional patent application Ser. No. 62/242,214, filed Oct. 15, 2015. This application also claims priority to and the benefit of, pursuant to 35 U.S.C. §119(a) on patent application Serial No. CN201510661305.1 filed in China on Oct. 14, 2015, and patent application Serial No. CN201610200537.1 filed in China on Mar. 31, 2016. The disclosures of the above applications are incorporated herein in their entireties by reference.

FIELD OF THE INVENTION

The present invention relates to the field of optical fiber sensing, and more particularly to a fiber grating demodulation system and method for enhancing spectral resolution of a detector array.

BACKGROUND OF THE INVENTION

Fiber grating is a novel passive sensing element having the advantages of high sensitivity, high electromagnetic interference resistance, and corrosion resistance. After fiber grating is applied to sensing, it has experienced rapid and sustained development, and has broad application prospects in safety monitoring in the fields of aeronautics and astronautics, building construction, and oil. A fiber grating demodulation system is the key part of an entire sensing system. Fiber grating demodulation technologies are developing toward the trend of high precision, high resolution, combination of dynamic and static parameters, multi-point multiplexing detection, and low costs. There are various fiber demodulation methods. Among others, the tunable F-P filter method can only be applied to the measurement of the static strain, the tunable laser method requires high costs, and the non-equilibrium Mach-Zender interference method is susceptible to environmental impact, which is conducive for engineering application. In recent years, with the rapid development of optical detectors, small fiber spectrometers have developed rapidly, and fiber demodulation technologies based on spectral imaging also have developed.

Fiber grating demodulators based on spectral imaging have a small size and high degree of integration, and can be applied to the measurement of both static and dynamic strains. Therefore, they have prominent advantages among the demodulation methods, and are an important research direction for demodulation systems. The performance of the optical system is the key of the demodulator because the performance of the optical system directly affects the system resolution.

There are various structures for the optical system of a grating spectrometer. Currently, the Czerny-Turner light path structure is commonly used, which uses two concave reflecting mirrors as a collimating mirror and an imaging focus mirror respectively and uses a planar reflective grating as a dispersion element. One reason is that the planar grating is not difficult to design, can be produced at low costs, and has a high diffraction efficiency. Another reason is that the Czerny-Turner structure has a large number of structural parameters that can be adjusted and set, which can prevent the occurrence of two or more times of diffraction, so that a photodetector array can be used to receive the spectrum. Common small Czerny-Turner spectrometers are mainly divided into two types: crossed-type and M-type. The M-type structure is a classic Czerny-Turner spectrometer structure, and a typical product of this type is Avaspec series small fiber spectrometer developed by Avantes, Holland. The crossed-type structure is an evolution from the M-type structure, and has a more compact structure and higher spatial utilization. However, as the number of pixels in a linear array image sensor is limited, the spatial resolution of the spectrum is limited.

Therefore, a technical problem to be solved in the art is how to implement accurate wavelength demodulation of a high resolution grating in the case of the limited number of pixels in a linear array sensor.

SUMMARY OF THE INVENTION

An objective of the present invention is to provide a fiber grating demodulation system for enhancing spectral resolution by finely adjusting a linear array detector, the demodulation system comprising a laser pump source, a wavelength division multiplexer, a fiber Bragg grating, a diaphragm, a slit, a collimating mirror, a light splitting grating, an imaging focus mirror, and a linear array detector, wherein the laser pump source, the wavelength division multiplexer, and the fiber Bragg grating are connected in sequence, and the wavelength division multiplexer is further connected to the diaphragm;

light emitted from the laser pump source is multiplexed by the wavelength division multiplexer and then enters the fiber Bragg grating, and a reflection spectrum of the fiber Bragg grating enters the slit of the fiber grating demodulation system as injected light, and after passing through the slit, the injected light is reflected by the collimating mirror, the light splitting grating, and the imaging focus mirror in sequence, and is finally converged to the linear array detector; and the linear array detector is capable of shifting along a direction parallel to imaging plane of the incident light within a certain of range in order to change the incident position of the light, so as to obtain a finer interference stripes at smaller intervals on the linear array detector.

Preferably, the shifting distance of the linear array detector is within 0-1 cm along the direction parallel to imaging plane of the incident light with respect to its original position.

Preferably, the linear array detector shifts at a step of 0.1 mm along the direction parallel to imaging plane of the incident light.

Preferably, the shifting distance of the linear array detector is adjusted at a high speed by using a piezoelectric execution element.

Preferably, the adjustment of the shifting distance of the linear array detector is implemented in following steps:

a) adjusting the piezoelectric execution element to a lowest end, a current voltage being recorded as an initial adjusted voltage;

b) recording spectrum data at the lowest end as an initial spectrum;

c) adjusting the piezoelectric execution element at a small step length, and calculating a current spectrum and the initial spectrum, wherein the piezoelectric execution element is a position servo, and a position instruction is inputted to control the linear array detector to shift by a small step of distance, so as to adjust a spatial position of incident light and determine a spectrum imaging position, a correlativity is calculated and recorded accordingly;

d) recording an adjusted voltage obtained when the correlativity reaches a peak value for the first time, as a final adjusted voltage; and e) equally dividing an interval between the initial adjusted voltage and the final adjusted voltage into a plurality of levels, and performing measurement for each level during each demodulation, so as to obtain a higher spectrum spatial resolution.

Preferably, a specific processing procedure of the step b) is as follows:

when there are 256 pixels, a first series of number consisting of 256 piecewise integrals are obtained: {I0, I1, I2, . . . , I255};

when a scan is performed on the pixels by slightly shifting the linear array detector along a given direction, a second series of number are obtained: {I0', I1', I2', . . . , I255'};

subtracting the first series from the second series to obtain a third series of number: {I0'-I0, I1'-I1, I2'-I2, . . . , I255'-I255}, that is, {G1-G0, G2-G1, G3-G2, . . . }, where G0 represents a true light intensity value at position 0, and G1 represents a light intensity value at position 1;

summing the third series to obtain {G1-G0, G2-G0, G3-G0, . . . , G255-G0}, thus obtaining new values of the first time of fine adjustment;

obtaining new values of the second time of fine adjustment in a similar way;

obtaining interpolations of the N times of fine adjustment if fine adjustment is performed N times;

recording the sum of the series of number as correlativity and the change of the correlativity accordingly.

The fiber grating demodulation system and the method of adjusting the shifting of the linear array detector according to the present invention can enhance the spectral resolution of the linear array detector. It can also reduce the width of the spectrum of the incident light, and a finer interference stripes at smaller intervals can be obtained provided that the resolution of the grating is fixed. Finally, a higher imaging spectrum resolution can be obtained.

It should be understood that the above general description and the following detailed description are both provided for exemplary and explanatory purposes, and should not be construed as limiting the scope of protection of the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF THE INVENTION

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

Hereinafter, embodiments of the present invention will be described with reference to the drawings. In the drawings, like reference numerals designate like or similar parts or steps.

Figure 1:
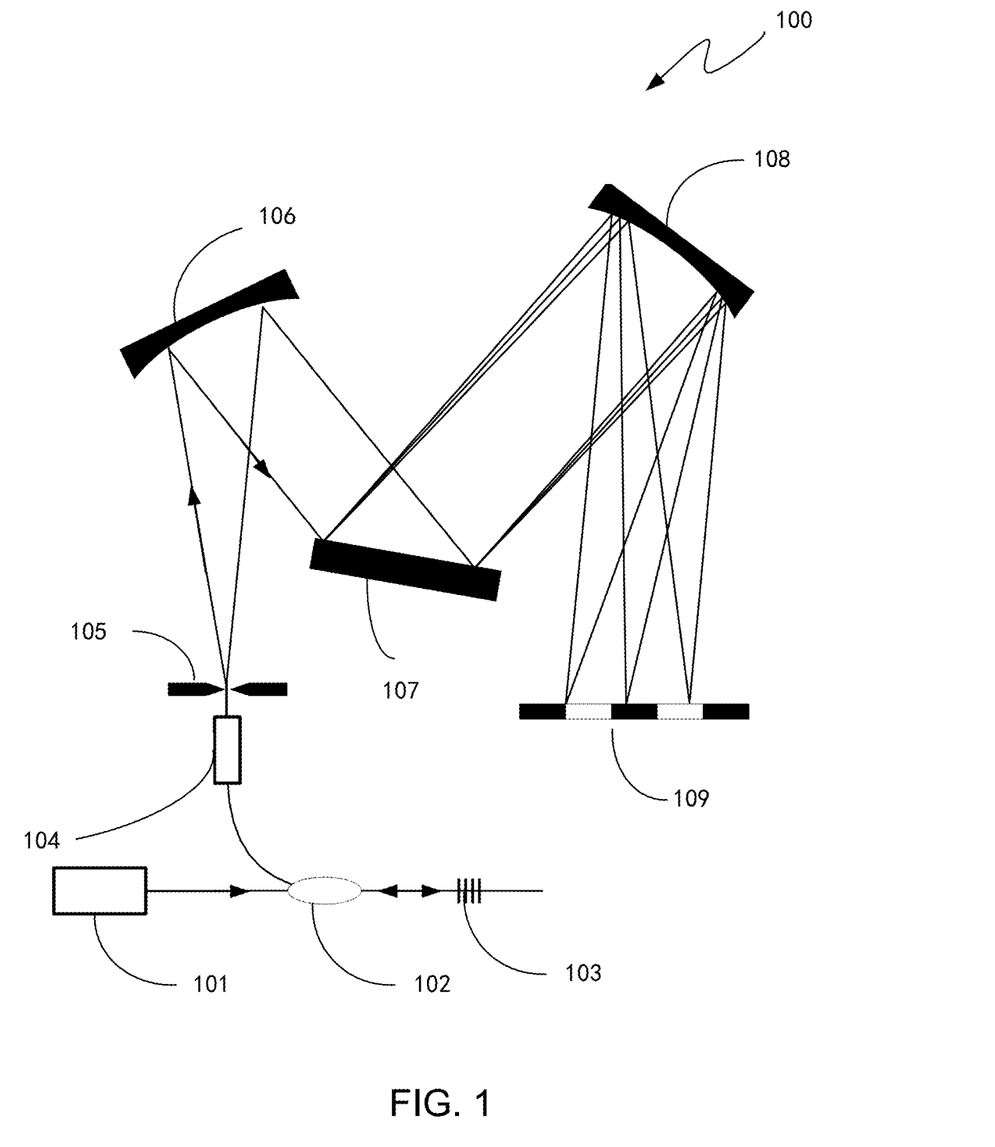
FIG. 1 is a schematic structural view of a fiber grating demodulation system for enhancing spectral resolution of a linear array image sensor according to the present invention.

FIG. 1 is a schematic structural view of a fiber grating demodulation system for enhancing spectral resolution of a linear array image sensor according to the present invention. The present invention provides a fiber grating demodulation system 100 for enhancing spectral resolution of a linear array image sensor by finely adjusting a linear array detector shifting.

As shown in FIG. 1, the fiber grating demodulation system 100 includes a laser pump source (LD) 101, a wavelength division multiplexer (WDM) 102, a fiber Bragg grating (FBG) 103, a diaphragm 104, a slit 105, a collimating mirror 106, a light splitting grating 107, an imaging focus mirror 108, and a linear array detector (CCD) 109. The laser pump source 101, the wavelength division multiplexer 102, and the fiber Bragg grating 103 are connected in sequence along the light emitted by the laser pump source (LD) 101. The wavelength division multiplexer 102 is further connected to the diaphragm 104. Light emitted from the laser pump source 101 is coupled by the wavelength division multiplexer 102 and then enters the fiber Bragg grating 103, and a reflection spectrum of the fiber Bragg grating 103 enters the fiber grating demodulation system as injected light. After passing through the slit 105, the injected light is reflected by the collimating mirror 106, the light splitting grating 107, and the imaging focus mirror 108 in sequence, and is finally converged to the linear array detector (CCD) 109.

Firstly, the laser pump source 101, the wavelength division multiplexer 102, and the fiber Bragg grating 103 are fused in a manner as shown in FIG. 1. The fiber Bragg grating 103 should have a high reflectivity and a narrow line width. According to the embodiments of the present invention, parameters of the wavelength division multiplexer (WDM) 102 and the fiber Bragg grating (FBG) 103 need to match pump wavelength of the laser pump source 101 and laser emission wavelength parameters. Specific parameters are as shown in Table 1.

TABLE 1

Light source parameter of reflection spectrum of demodulation system according to the present invention

| Doped element | Peak absorption | Cutoff wavelength | Core diameter | Pump wavelength | Laser wavelength | WDM wavelength |
|---|---|---|---|---|---|---|
| Erbium (Er) | 16 dB/m@1530 nm<br>16 dB/m@1530 nm<br>16 dB/m@1530 nm<br>A doped fiber having a low coefficient of absorption may be used | 800-980 nm<br>1100-1400 nm | Single mode<br>4/125 μm<br>8/125 μm<br>10/125 μm(✓) | 976 nm(✓)<br>980 nm(✓)<br>1480 nm | 1530 nm-1560 nm<br>(typically<br>1535 nm) | 976/1550 nm |
| Ytterbium (Yb) | 280 ± 50 dB/m@920 nm<br>0.6 ± 0.2 dB/m@920 nm<br>1.8 ± 0.4 dB/m@920 nm | 1010 ± 70 nm | | 915 nm(✓)<br>976 nm | 1060 nm-1090 nm<br>(typically<br>1064 nm) | 915/1064 nm |
| Erbium-and ytterbium-doped | 0.75 ± 0.15 dB/m@915 nm<br>40 ± 10 dB/m@1535 nm | 1440 ± 80 nm | | 976 nm | 1530 nm-1560 nm<br>(typically<br>1550 nm) | 976/1550 nm |

In an embodiment, if an erbium-doped fiber having a core diameter of 10/125 μm is used as a gain medium, a pigtail of the laser pump source LD and the wavelength division multiplexer WDM need to use the same core diameter. The output wavelength of the laser pump source LD is 976 nm, the working wavelength of the wavelength division multiplexer WDM is 976/1550 nm, a wavelength of the fiber Bragg grating FBG is selected from a range of 1530 nm to 1560 nm, and a laser output can be obtained from this range. In an embodiment, if an ytterbium-doped fiber having a core diameter of 10/125 μm is used as a gain medium, the pigtail of the laser pump source LD and the wavelength division multiplexer WDM need to use the same core diameter. The laser pump source LD is a 915 nm single-mode output, the working wavelength of the wavelength division multiplexer WDM is 915/1064 nm, a wavelength of the fiber Bragg grating FBG is near 1064 nm, and a laser output can be obtained within this range.

The reflected light of the fiber Bragg grating 103 is irradiated to the collimating mirror 106 as incident light through the diaphragm 104, to maintain beam collimation. Then, the collimated light is irradiated to the light splitting grating 107 and is split by diffraction, passes through the imaging focus mirror 108, and is then converged to the linear array detector 109.

The light splitting grating 107 can be implemented by Fiber Bragg Grating (FBG). The light splitting spectrum of the light splitting grating 107 may be represented by formula (1)

$$n\lambda = d(\sin\alpha \pm \sin\beta) \qquad (1)$$

where n is the order of spectrum, and n=0, ±1, ±2, . . . ; α is an incident angle; β is a reflection angle; θ is a blaze angle; and d is a grating constant.

n=0 means a zero-order spectrum. In this case, β is irrelevant to λ, that is, no diffraction effect is provided. n=±1 and n=±2 respectively correspond to a first-order spectrum and a second-order spectrum. The first-order spectrum has strong energy and can be used for light splitting. The resolution of the grating is irrelevant to the wavelength. A spectrum obtained after separation is an even spectrum. The theoretical resolution of the grating is the product of the number of grating lines of the grating and the number of orders of spectrum, which may be represented by formula (2)

$$R = nN \qquad (2)$$

For a grating whose width is 50 mm and whose number of grating lines is 1200 lines/mm, the resolution of the first-order spectrum is 6×104.

The reflected light of the fiber Bragg grating 103 is used as an injected light source, which can reduce the spectral width of the incident light, so that finer interference stripes at smaller intervals can be obtained provided that the resolution of the grating is fixed. In this case, the linear array detector 109 is adjusted, that is, a position instruction is inputted to control the linear array detector 109 to shift step by step slightly, so as to adjust the spatial position of the incident light. Accordingly, the light path of the incident light to the light splitting grating is changed, and the stripes converged onto the linear array detector are also changed, thus finally a spectrum imaging position can be determined.

Figure 2:
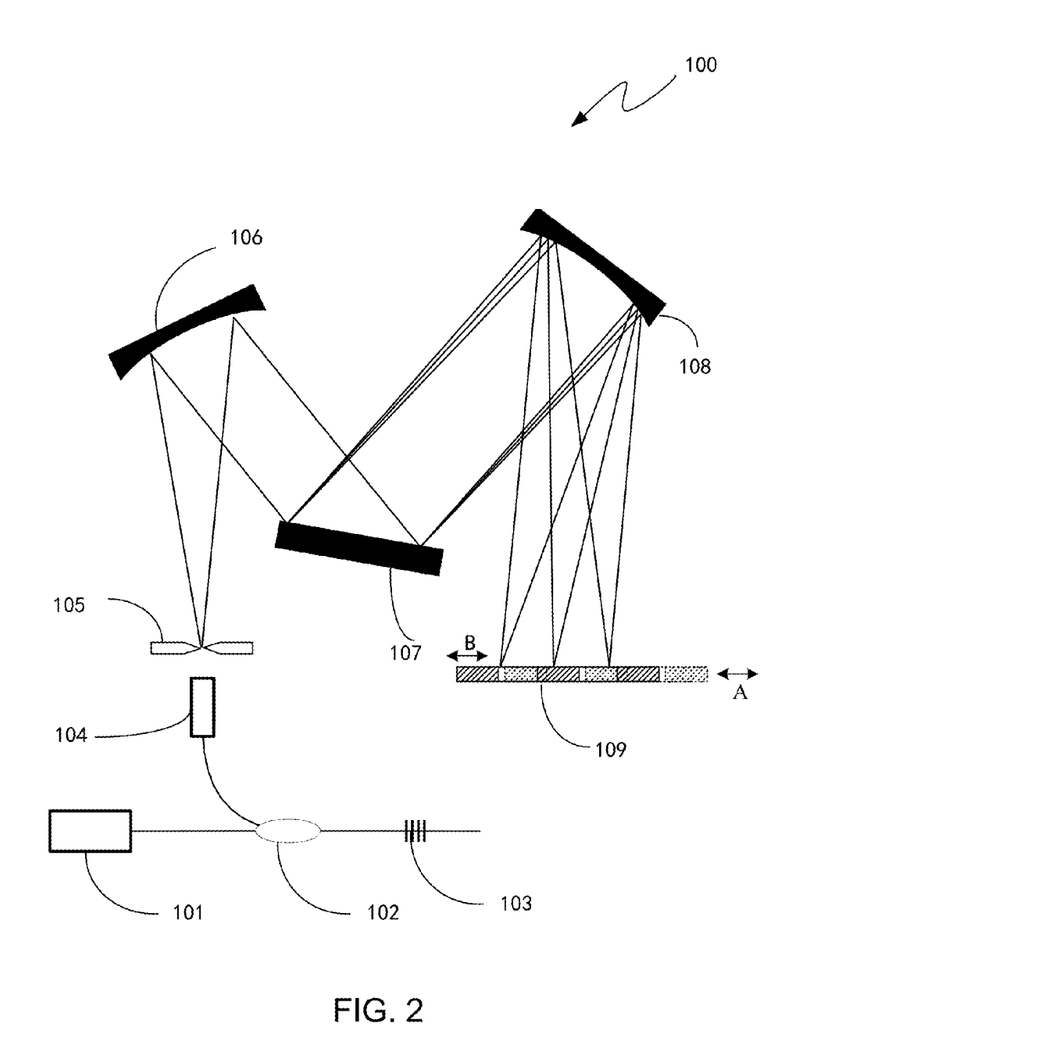
FIG. 2 is a schematic structural view of a fiber grating demodulation system for enhancing spectral resolution of a detector array by finely adjusting a linear array detector.

FIG. 2 is a schematic structural view of a fiber grating demodulation system for enhancing spectral resolution of a detector array by finely adjusting the shifting of the linear array detector 109. As shown in FIG. 2, the linear array detector 109 is adjusted in a way of shifting, so that the linear array detector 109 shifts along an arrow A shown in the figure. That is, the linear array detector 109 shifts along a direction (arrow A) parallel to imaging plane of the incident light within a certain of range, so as to change the incident position of the light falling onto linear array detector 109 after shifting, so as to obtain a finer interference stripes at smaller intervals on the linear array detector 109. According to an embodiment of the present invention, the shifting distance of the linear array detector 109 is within 0-1 cm along the direction parallel to imaging plane of the incident light with respect to its original position. Preferably, the linear array detector 109 shifts at a step of 0.1 mm along the direction parallel to imaging plane of the incident light.

According to an embodiment of the present invention, the change of shifting distance of the linear array detector 109 can be adjusted at a high speed using piezoelectric execution elements. The piezoelectric execution element is to control the shifting of the linear array detector 109 by a voltage control system, so that the light path of the incident light passing the slit 105 to the collimating mirror 106 is changed, and the stripes converged onto the linear array detector 109 are also changed correspondingly. In this way, the position at which the spectrum is imaged on the linear array image sensor 109 moves within a minimum pixel interval range, as shown by the arrow B. Slight movement of image stripes on the linear array detector 109 can be achieved by adjusting the shifting distance of the linear array detector 109, so that the image stripes can fall between the intervals of the linear array detector 109, thereby improving the imaging resolution and the spectrum resolution precision.

Figure 3:
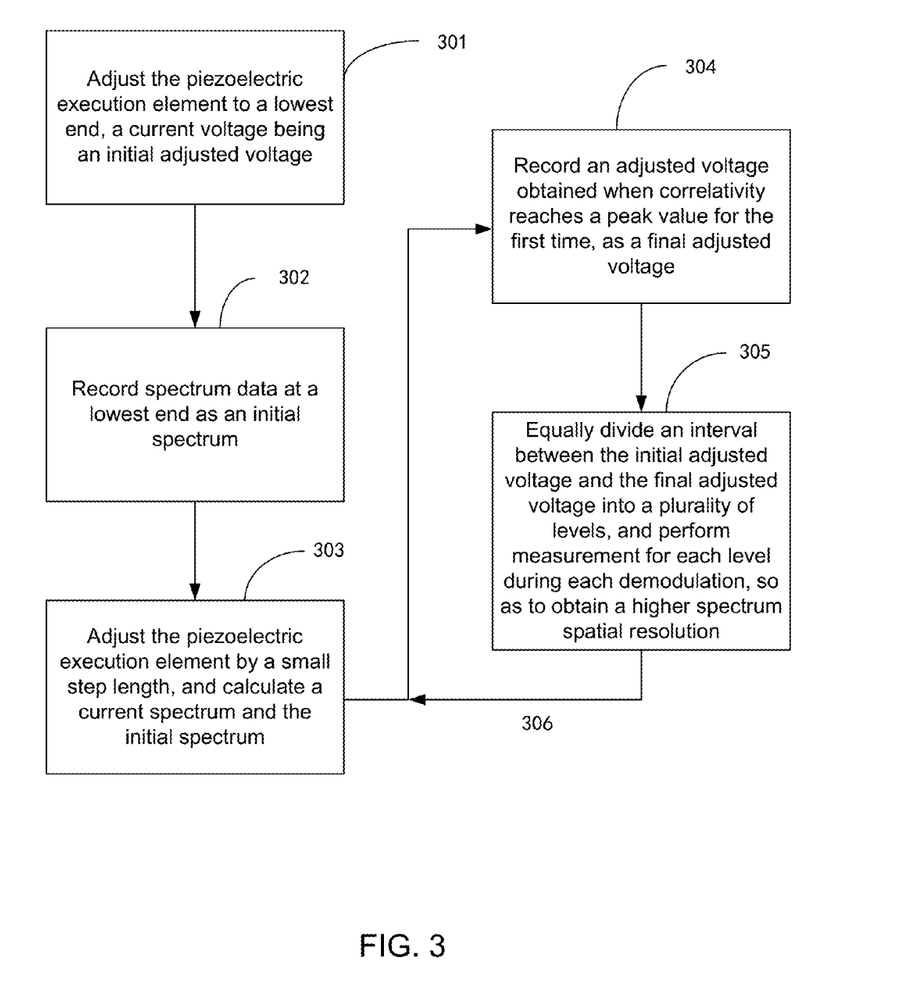
FIG. 3 is a flow chart of a feedback control method of a fiber grating demodulation system for enhancing spectral resolution of a linear array image sensor by finely adjusting a linear array detector according to the present invention.

FIG. 3 is a flow chart of a feedback control method of a fiber grating demodulation system by shifting the linear array detector for enhancing spectral resolution of a linear array image sensor according to the present invention. The control method is specifically as follows:

At Step 301, the piezoelectric execution element for shifting the linear array detector is adjusted to a lowest end, and the current voltage is recorded as an initial adjusted voltage.

At Step 302, the spectrum data at the lowest end is recorded as an initial spectrum.

At Step 303, the piezoelectric execution element is adjusted at a small step length. In an embodiment, the piezoelectric execution element is a position servo. A position instruction is inputted to control the shifting distance of the linear array detector, and the current voltage and the spectrum are recorded.

By adjusting the shifting distance of the linear array detector, when the distance by which the Gaussian image moves on a CCD reaches the width of one pixel, one scan is completed. The data of respective measurements of one scan is interpolated respectively to form a smoother curve. Then the pixel data will be processed as follows: An output of a pixel is a sectional integral of a light intensity curve. When there are 256 pixels, a first series of number consisting of 256 piecewise integrals are obtained: $\{I0, I1, I2, \ldots, I255\}$; when a scan is performed on the pixels by slightly shifting the linear array detector along a given direction, a second series of number are obtained: $\{I0', I1', I2', \ldots, I255'\}$; subtracting the first series from the second series to obtain a third series of number: $\{I0'-I0, I1'-I1, I2'-I2, \ldots, I255'-I255\}$, that is, $\{G1-G0, G2-G1, G3-G2, \ldots\}$, where $G0$ represents a true light intensity value at position 0 (it should be noted that it is the value at position 0, rather than a light intensity integral at the pixel scale), and $G1$ represents a light intensity value at position 1; summing the third series to obtain $\{G1-G0, G2-G0, G3-G0, \ldots, G255-G0\}$, thus obtaining new values of the first time of fine adjustment; then, obtaining new values of the second time of fine adjustment in a similar way. If fine adjustment is performed N times, interpolations of the N times of fine adjustment are obtained. The sum of the series of number is recorded as correlativity and the change of the correlativity is also recorded accordingly.

At Step 304, the voltage for adjusting the linear array detector is recorded as a final adjusted voltage at the time when the correlativity reaches a peak value for the first time.

At Step 305, the interval between the initial adjusted voltage and the final adjusted voltage is equally divide into a plurality of levels, and the shifting distance of the linear array detector is determined according to the levels.

At Step 306, return to Step 303 to repeat the process, and perform measurement for each level during each demodulation, so as to obtain a higher spectrum spatial resolution.

Figure 4A:
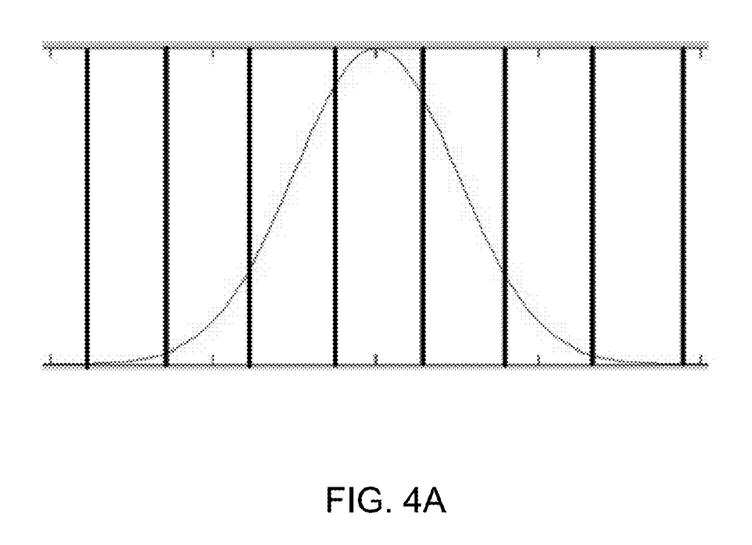
FIG. 4A is a graph illustrating a one-dimensional Gaussian curve distribution of light intensity in space.
Figure 4B:
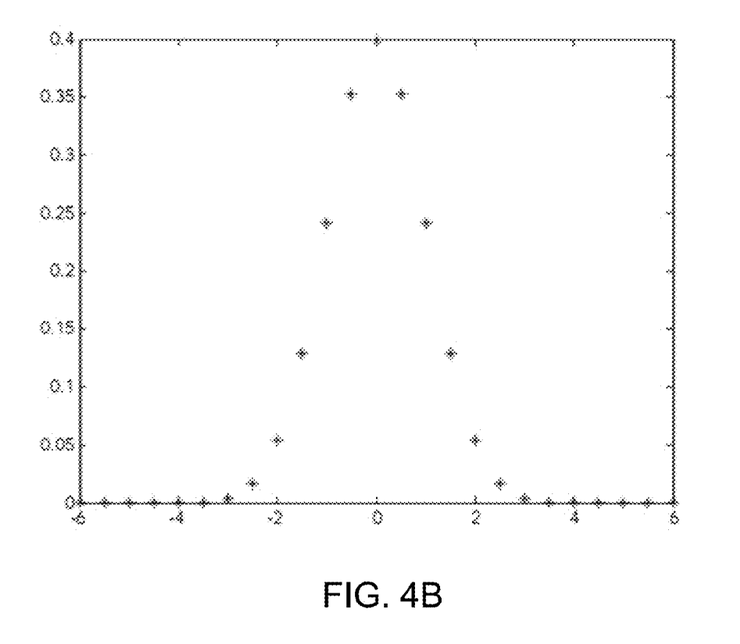
FIG. 4B is a graph illustrating an interpolation result of multiple measurement results obtained after scanning without the linear array detector shifting adjustment.
Figure 4C:
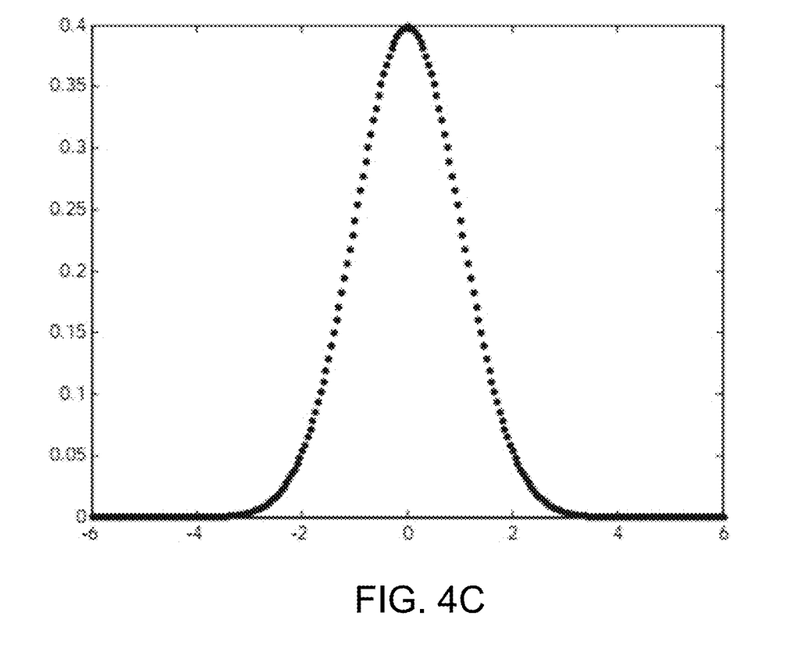
FIG. 4C is a graph illustrating an interpolation result of multiple measurement results obtained after scanning with the linear array detector shifting adjustment.

FIG. 4A to 4C show the image curve to show the principle of enhancing the spectral resolution of the spectrum by adjusting the shifting distance of the linear array detector according to the present invention.

FIG. 4A is a graph illustrating a one-dimensional Gaussian curve distribution of light intensity in space. A light beam whose light intensity is in the form of a one-dimensional Gaussian curve distributed in space is irradiated on a CCD sensor. Pixels of the CCD are densely arranged. Each pixel is equivalent to a vertical block, as shown in FIG. 4A. An output of a pixel is actually an integral of total light intensity at the pixel. Due to excessive discreteness, the image resolution will be reduced. In order to increase the number of sampling points of the curve, the shifting distance of the linear array detector is adjusted to change the position of the Gaussian curve on the CCD sensor, which is equivalent to moving the CCD sensor to sample different positions of the curve. The fine adjustment of the linear array detector is equivalent to the fine adjustment of the position of the sensor. In this way, the curve can be better plotted.

FIG. 4B is a graph illustrating an interpolation result of multiple measurement results obtained after scanning without the adjustment of the linear array detector shifting.

FIG. 4C is a graph illustrating an interpolation result of multiple measurement results obtained after scanning with the adjustment of the linear array detector shifting. As can be seen from FIGS. 4B and 4C, the shifting distance of the linear array detector is adjusted. When the distance by which a Gaussian image is adjusted to move on the CCD reaches the width of one pixel, one scan is completed. The data of respective measurement of one scan is interpolated respectively to form a smoother curve.

The fiber grating demodulation system and the method of adjusting the shifting of the linear array detector according to the present invention can enhance the spectral resolution of the linear array detector. It can also reduce the width of the spectrum of the incident light, and a finer interference stripes at smaller intervals can be obtained provided that the resolution of the grating is fixed. Finally, a higher imaging spectrum resolution can be obtained.

Based on the description and practice of the present invention as disclosed herein, other embodiments of the present invention are readily conceived of and understood to those skilled in the art. The description and embodiments are provided for exemplary purpose only, the real scope and spirit of the present invention are defined by the claims.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. A fiber grating demodulation system for enhancing spectral resolution by finely adjusting a linear array detector, the demodulation system comprising a laser pump source, a wavelength division multiplexer, a fiber Bragg grating, a diaphragm, a slit, a collimating mirror, a light splitting grating, an imaging focus mirror, the linear array detector, and a processor, wherein the laser pump source, the wavelength division multiplexer, and the fiber Bragg grating are connected in sequence, and the wavelength division multiplexer is further connected to the diaphragm;

light emitted from the laser pump source is multiplexed by the wavelength division multiplexer and then enters the fiber Bragg grating, and a reflection spectrum of the fiber Bragg grating enters the slit of the fiber grating demodulation system as injected light, and after passing through the slit, the injected light is reflected by the collimating mirror, the light splitting grating, and the imaging focus mirror in sequence, and is finally converged to the linear array detector; and the linear array detector is configured to shift along a direction parallel to an imaging plane of the incident light within a certain range in order to change an incident position of the light, so as to obtain finer interference stripes at smaller intervals on the linear array detector, wherein the adjustment of the shifting distance of the linear array detector is implemented by the processor in following steps:
a) adjusting the piezoelectric execution element to a lowest end, a current voltage being recorded as an initial adjusted voltage;
b) recording spectrum data at the lowest end as an initial spectrum;
c) adjusting the piezoelectric execution element at a small step length, and calculating a current spectrum and the initial spectrum, wherein the piezoelectric execution element is a position servo, and a position instruction is inputted to control the linear array detector to shift by a small step of distance, so as to adjust a spatial position of incident light and determine a spectrum imaging position, a correlativity is calculated and recorded accordingly;
d) recording an adjusted voltage obtained when the correlativity reaches a peak value for the first time, as a final adjusted voltage; and
e) equally dividing an interval between the initial adjusted voltage and the final adjusted voltage into a plurality of levels, and performing measurement for each level during each demodulation, so as to obtain a higher spectrum spatial resolution.

2. The fiber grating demodulation system according to claim 1, wherein the shifting distance of the linear array detector is within 0-1 cm along the direction parallel to the imaging plane of the incident light with respect to its original position.

3. The fiber grating demodulation system according to claim 1, wherein the linear array detector shifts at a step of 0.1 mm along the direction parallel to the imaging plane of the incident light.

4. The fiber grating demodulation system according to claim 1, wherein the shifting distance of the linear array detector is adjusted at a high speed by using a piezoelectric execution element.

5. The fiber grating demodulation system according to claim 1, wherein a specific processing procedure of the step b) is as follows:

when there are 256 pixels, a first series of number consisting of 256 piecewise integrals are obtained: {I0, I1, I2, . . . , I255};

when a scan is performed on the pixels by slightly shifting the linear array detector along a given direction, a second series of number are obtained: {I0', I1'I2', . . . , I255'};

subtracting the first series from the second series to obtain a third series of number: {I0'-I0, I1'-I1, I2'-I2, . . . , I255'-I255}, that is, {G1-G0, G2-G1, G3-G2, . . .} where G0 represents a true light intensity value at position 0, and G1 represents a light intensity value at position 1;

summing the third series to obtain {G1-G0, G2-G0, G3-G0, . . . , G255-G0}, thus obtaining new values of the first time of fine adjustment;

obtaining new values of the second time of fine adjustment in a similar way;

obtaining interpolations of the N times of fine adjustment if fine adjustment is performed N times;

recording the sum of the series of number as correlativity and the change of the correlativity accordingly.

* * * * *